United States Patent [19]

Bowers, Jr.

[11] Patent Number: 5,272,906
[45] Date of Patent: Dec. 28, 1993

[54] AIRCRAFT STALL ALARM TESTING TOOL

[76] Inventor: Kenneth R. Bowers, Jr., 2346 E. Orangewood Ave., Phoenix, Ariz. 85020

[21] Appl. No.: 947,439

[22] Filed: Sep. 21, 1992

[51] Int. Cl.⁵ .............................. G01C 9/00
[52] U.S. Cl. ............................. 73/1 R; 73/180
[58] Field of Search ............... 73/180, 178 R, 1 R; 244/1 R

[56] References Cited

U.S. PATENT DOCUMENTS 2,497,494  2/1950  Flemming ................ 244/1 R
3,630,169  12/1971  Corey ........................ 73/180

Primary Examiner—Richard E. Chilcot, Jr.
Assistant Examiner—Joseph L. Felber

[57] ABSTRACT

An airplane stall alarm testing tool applies a temporary partial vacuum to a stall horn installed in an aircraft wing. The tool mechanically or otherwise creates a vacuum without human direct oral contact with the aircraft and enables testing by a pilot unable to reach the horn.

8 Claims, 1 Drawing Sheet

AIRCRAFT STALL ALARM TESTING TOOL

BACKGROUND

This invention relates to testing tools for stall alarms used on aircraft.

The importance of detecting an airplane stall in advance to enable a pilot to prevent the stall has caused most or all aircraft to have stall alarms. While several types of stall alarms exist, a common type consists of a horn installed in a wing leading edge. The horn emits a sound or shriek when flight conditions are trending to a stall as detected by the creation of an atmospheric vacuum at the wing leading edge; an inherent aerodynamic feature of a stalled wing. The vacuum draws air through the horn, making a sound.

A stall horn can be rendered inoperative by a variety of failure mechanisms including a hidden blockage, but pilots rely on the horn to warn of an impending stall. Because failure of the horn can lead to an unanticipated stall and an airplane crash, the alarm should be tested prior to every flight. Preflight procedures do specify a mandatory stall horn operation check. A Cessna Aircraft Corp. publication, entitled "MODEL 152 INFORMATION MANUAL" dated 1981, states on page 4-6 ". . . 2. STALL WARNING OPENING—CHECK for blockage. To check the system, place a clean handkerchief over the vent opening and apply suction; a sound from the warning horn will confirm system operation." This procedure checks the horn by orally creating a vacuum at the horn.

The leading edge of an aircraft passes through the atmosphere at high speed during flight with the consequence that the area around the stall horn is subjected to insect impact. The horn is contaminated by insect fluids and debris, such that oral contact and suction with the area, even through a cloth, is unpleasant. Additionally, the stall horn is often located above the height of an average sized pilot such that it is out of easy reach. Many pilots do not test the stall horn for the reasons stated above.

A search of the prior art has revealed no prior art relating to a stall warning horn testing tool. The Cessna booklet teaches away from the use of any tool. A search of pilot supply shops and mail order catalogs indicates a total absence of any such tool. As an example in point, refer to the Sporty's Pilot Shop Catalog, dated August, 1992.

Consequently, it is an object of this invention to provide a stall horn testing tool which will avoid the disadvantages discussed and result in safer aviation generally.

SUMMARY OF THE INVENTION

This tool tests airplane stall warning alarms of the vacuum horn type. The tool applies a vacuum to an end of the stall horn causing an operable stall horn to shriek as it would prior to a stall. The tool is elongated to enable testing of the horn from a remote position. One end of the tool is shaped to mate with a wing to form an approximately air tight seal against the wing surface or against the horn structure. At another end of the tool, means to apply a vacuum is supplied. The vacuum source may be an expandable bellows, an oral mouthpiece, a venturi effect nozzle, or other means.

DETAILED DESCRIPTION

Figure 1:
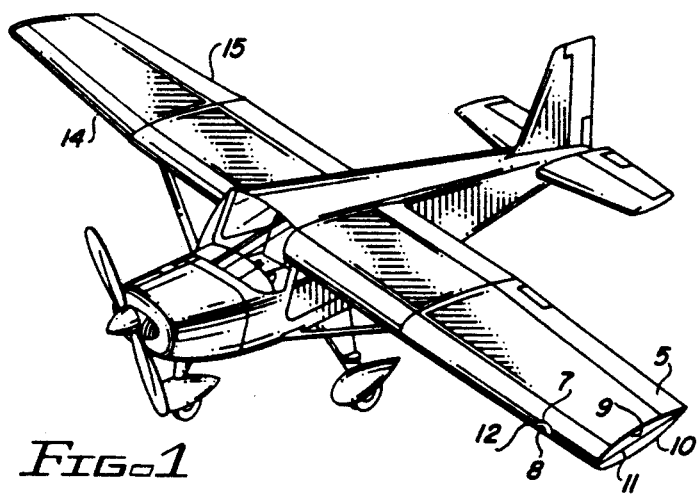
FIG. 1 is a perspective view of an aircraft with an installed stall warning alarm horn of the vacuum type.

FIG. 1 is a view of a typical small airplane with an installed stall horn 12 in wing 5. This is an aircraft of the "high wing" type so that stall horn 12 is difficult to reach. The numeral 5 designates an airplane wing used to create lift to support flight of the airplane. Wing 5 has a leading edge 14 and a trailing edge 15. In cross section, wing 5 has a profile of upper camber 9 and lower camber 10.

A hole 7 is cut in the outer skin of wing 5 and a stall warning horn 12 is fixed to wing 5 by rivets. Horn 12 is generally installed where upper camber 9 and lower camber 10 meet, on the leading edge 14 which faces forward into the wind blast. For information relating to the function and construction of a stall horn, refer to U.S. Pat. No. 5,057,832, "Audible Glide Speed Indicator Apparatus" to England, incorporated herein by reference.

Figure 2:
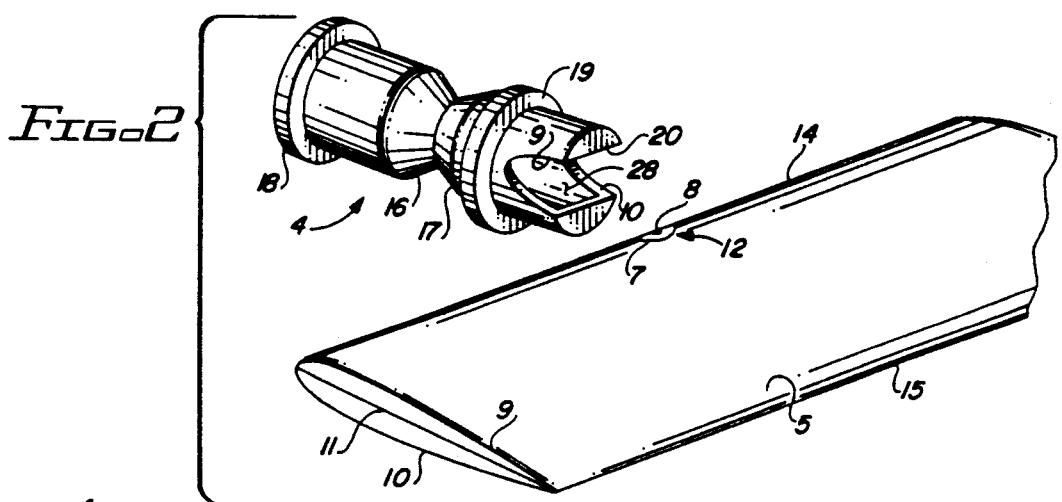
FIG. 2 is a perspective view of a first embodiment of a stall horn testing tool in proximity to a stall horn.

FIG. 2 is a view of a first embodiment of a tool 4 to test a stall horn. Generally fabricated as one single piece of molded flexible plastic, the tool has two general sections. A first section has a hand grip 18 and an expandable bellows 16. A second section at the opposite end has a second hand grip 19 and a slot 28. FIG. 2 also has an aircraft wing 5 with an installed stall alarm 12. Note that the size of tool 4 is enlarged with respect to wing 5 for clarity in FIG. 2. The elliptical upper surface of wing 5 is defined as the upper camber 9. The lower elliptical surface of wing 5 is defined as the lower camber 10. The imaginary line 11 is defined as the chord line: it is the line from the leading edge 14 to the trailing edge 15 at the intersections of cambers 9, 10. For a detailed description of the geometry of an aircraft wing, refer to "Theory of Wing Sections", by Abbott et al, Library of Congress 60-1601, 1949, especially pages 111-123. Stall horn 12 is usually installed on chord line 11. The air flow to stall horn 12 is via a hole 8 which is usually rectangular. Hole 8 thus spans an area of wing 5 where upper camber 9 meets lower camber 10. The geometry of the cross section in the plane perpendicular to the longitudinal axis of stall horn 12 is elliptical.

Slot 28 of the tool has a curved surface 20 designed to mate with the surface of the wing 5. Slot 28 thus also has an upper camber 9 and lower camber 10. The Abbott reference contains a detailed mathematical definition of these surfaces at pages 112 to 113. The upper camber surface 9 of the wing 5 and tool 4 has the form:

$Xu = X - Yt \sin \theta$, $Yu = YC + Yt \cos \theta$

The lower camber surface 9 of the wing 5 and tool 4 has the form:

XL=X+Yt SIN theta, YL=Yc−Yt COS theta where the abscissas ordinates and slopes of a mean line are defined as Xc, Yc, and tan theta respectively, and Xu and Yu are the abscissa and ordinate of upper surface 9 of wing 5 and tool 4. Also, XL and YL are the abscissa and ordinate of lower surface 10 of wing 5 and tool 4. The mean line is a line drawn midway between surfaces 10 and 9. Page 111 of the Abbott reference defines the symbols.

Figure 3:
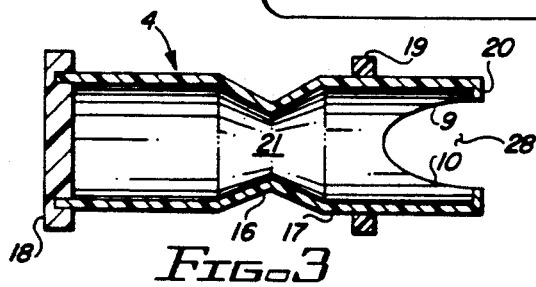
FIG. 3 is an elevation view in section of a stall horn testing tool in a first embodiment, having an expanded bellows.
Figure 4:
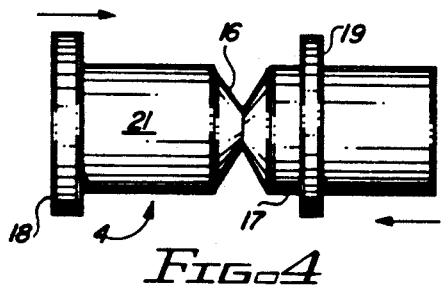
FIG. 4 is an elevation view of a first embodiment of the invention having a compressed bellows.

Refer to FIG. 3. In this preferred embodiment, a tool 4 for testing stall horn 12 is shown to be a flexible, expandable bellows 16 disposed to cover the stall horn 4 opening 8 and mate with wing 5 surface in a gaseous tight seal at seal surface 20. Tool 4 is generally hollow, and expansion of bellows 16 creates a vacuum because the internal volume 21 of the tool is increased while air ingress is restricted except that air can enter via the stall horn. Bellows 16 is in fluid communication with horn 12. Seal surface 20 is adapted to mate with the wing 5 surface and therefore may have an upper and lower camber elliptical profile if the installation of the alarm in the wing requires. Otherwise even a flat profile may suffice. The tool has a first hand grip 18 at one end and a second hand grip 19 at a second end. An elongated, generally flexible section 17 connects bellows 16 to mate surface 20. The tool operates as follows: using hand pressure on grip 19, the pilot forces surface 20 into sealing contact with wing 5 covering opening hole 8 entirely. Using hand pressure on grip 18 while maintaining said pressure on grip 19, the pilot expands bellows 16 thereby enlarging volume 21 and creating a partial vacuum in volume 21. If stall alarm horn 12 is operable, it will shriek, or whistle, or otherwise create a sound. If the alarm is failed, no shriek will occur. In FIG. 3, bellows 16 is shown in an expanded configuration. In FIG. 4, bellows 16 has been compressed somewhat to illustrate the flexibility of the tool. The arrows show the directions in which force is applied to the tool by the grips 18, 19 and by the airplane wing during compression prior to the horn test by tool 4 expansion. In FIG. 4, tool 4 has been rotated so that slot 28 is not visible.

Figure 5:
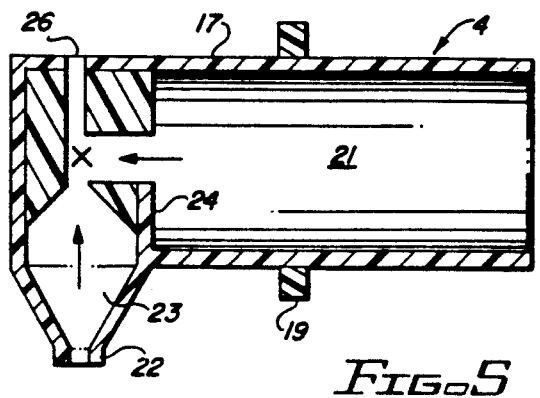
FIG. 5 is an elevation view of a second embodiment of the invention having a venturi chamber for vacuum application.

Refer to FIG. 5. A second embodiment is shown in which the means for creating the vacuum in volume 21 has been changed. A venturi chamber 24 is attached to section 17. Air blown into mouthpiece 22 passes in the direction of arrow 23 and develops a low pressure at point X to create a vacuum at volume 21 to test horn 12. The physics of a venturi tube is common knowledge, but briefly stated, a flowing air stream in constricted by passage through a narrowing tube which causes its mass flow velocity to increase and the air pressure to decrease. An inlet at the point X of decreased pressure experiences a partial vacuum.

In the current application, the pilot expels respired air into a venturi tube having a narrowing section tapped into the chamber sealed to the alarm horn. The vacuum induced by the venturi effect causes the horn, if operable, to shriek.

As an alternative, the tool vacuum can be created by suction on a mouthpiece. In FIG. 5, mouthpiece 22 can be used to create a vacuum if outlet 26 is closed, perhaps by coverage by a human hand.

Figure 6:
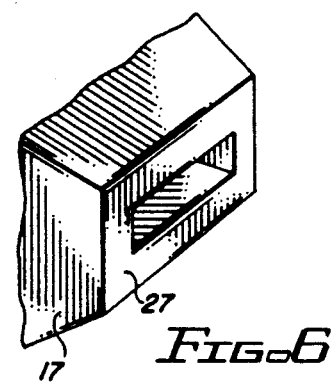
FIG. 6 is a perspective view of a detail of an embodiment of the invention in which the tool is insertable into the stall horn cavity and jams in the opening to create a seal.

Refer to FIG. 6. This Figure shows an alternative to the method of sealing tool 4 to wing 5. As shown, section 17 of tool 4 tapers to a square or rectangular section 27 which is disposed to mate with and enter hole 8. Section 17 forms a wedge in a longitudinal axis of tool 4. The tool section 17 is extended into hole 8 until it sealingly jams in hole 8. Of course section 17 must have a cross section identical in geometry to the geometry of the cross section of hole 8.

In the above specification, a tool 4 has been described which accomplishes the desired stall horn test. Devices as described have been constructed and tested and are found to test the stall horn with ease. The vacuum which can be achieved by use of the human lungs suffices, whether by suction through a mouthpiece, or by expired air forced through a venturi. The bellows type also works easily.

The devices described to implement this invention are considered the best embodiments, but many modifications can be implemented without departure from the true scope of the invention. The invention in its general form comprises vacuum creating means for generating a partial vacuum to test the alarm connected to sealing means for sealing the tool to the aircraft.

In the Drawings, the claims, and in this Specification, similar numbers denote similar features, and the term "airplane" is defined to include a stall alarm.

I claim:

1. An airplane wing stall alarm horn testing tool for applying a partial vacuum to said stall horn to create a sound indicative of proper alarm operation, a lack of said sound indicative of alarm failure, which comprises vacuum creation means for applying a vacuum to said alarm connected to an aircraft surface; and sealing means for sealing said tool to a surface of said airplane defined as inclusive of said alarm.

2. The tool of claim 1 wherein said vacuum creation means comprises an expandable bellows.

3. The tool of claim 1 wherein said vacuum creation means comprises a venturi chamber.

4. The tool of claim 1 wherein said tool sealing means has an elongated section rectangular in cross section and wedge shaped in a longitudinal axis so as to enter and sealingly jam inside said alarm.

5. The tool of claim 1 wherein said tool comprises sealing means which has a sealing surface elliptical in cross section so as to mate with a surface of said aircraft wing.

6. The tool of claim 1 wherein said tool comprises sealing means which has a sealing surface of geometry in cross section defined by the following mathematical equations for an upper camber surface (9);

Xu=X−Yt SIN theta, Yu=YC+Yt COS theta and for a lower camber surface (10);

XL=X+Yt SIN theta, YL=Yc−Yt COS theta where the abscissas, ordinate, and slopes of a mean line are defined as Xc, Yc, and tan theta respectively, and Xu and Yu are the abscissa and ordinate of upper surface (9) of the wing and tool, and XL and YL are the abscissa and ordinate of lower surface (9) of the wing and tool and the mean line is a line drawn midway between surfaces (10) and (9).

7. The tool of claim 1 wherein said vacuum creation means comprises a mouthpiece for operator orally applied suction.

8. The tool of claim 1 additionally comprising at least one hand grip means for the application of operator manual force.

* * * * *